United States Patent [19]

Toyoda

[11] Patent Number: 4,635,128
[45] Date of Patent: Jan. 6, 1987

[54] POCKET MACHINERY CABINET

[75] Inventor: Mitsuru Toyoda, Suwa, Japan

[73] Assignee: Seiko Epson Kabushiki Kaisha, Tokyo, Japan

[21] Appl. No.: 620,790

[22] Filed: Jun. 15, 1984

[30] Foreign Application Priority Data

Jun. 29, 1983 [JP] Japan ................. 58-117288
Sep. 14, 1983 [JP] Japan ............. 58-143106[U]
Feb. 6, 1984 [JP] Japan ................. 59-20601

[51] Int. Cl.⁴ .............................................. H04N 5/74
[52] U.S. Cl. .................... 358/236; 358/241; 340/784
[58] Field of Search ............... 358/236, 254, 255, 241; 312/7.2; 361/380; D14/77, 79, 80, 81, 82, 83, 84; 350/345; 340/784, 765

[56] References Cited

U.S. PATENT DOCUMENTS

| 4,185,895 | 1/1980 | Stephens et al. | 350/345 |
| 4,403,216 | 9/1983 | Yokoi | 340/784 X |
| 4,487,481 | 12/1984 | Suzawa | 350/345 |
| 4,542,903 | 9/1985 | Yokoi et al. | 340/784 X |
| 4,562,478 | 12/1985 | Hirasawa et al. | 358/236 |

FOREIGN PATENT DOCUMENTS 50-46098 4/1975 Japan .

OTHER PUBLICATIONS

Yoshiyama et al., Pocket-Sized Liquid Crystal TV Receiver, Jun. 1979, pp. 500–508, National Technical Report, vol. 25, #3.
Yamano et al., The 5-Inch Size Full Color Liquid Crystal Television Addressed by Amorphous Silicon thin Film Transistors, Dec. 1984, pp. 39–46, IEEE.

Primary Examiner—James J. Groody
Assistant Examiner—E. Anne Toth
Attorney, Agent, or Firm—Blum Kaplan Friedman Silberman & Beran

[57] ABSTRACT

A cabinet for pocket machinery having a transmissive liquid crystal display member. The cabinet includes a first cabinet member for holding the liquid crystal display member and electronic circuitry. The first cabinet member has a cavity at its rear. The liquid crystal display member is coupled to the rear of the first cabinet member within the cavity. A second cabinet member fits within the cavity in the first cabinet member and is removable from the cavity in the first cabinet member. The removal of the second cabinet member from the cavity in the first cabinet member exposes the liquid crystal display member.

34 Claims, 15 Drawing Figures

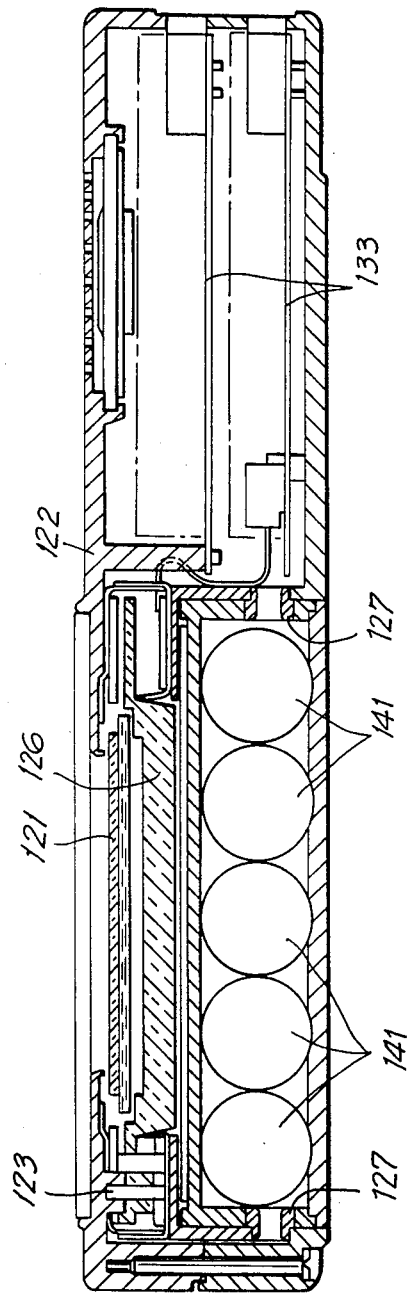

POCKET MACHINERY CABINET

BACKGROUND OF THE INVENTION

This invention is generally related to a cabinet for pocket machinery and in particular to a cabinet for a pocket machine having a liquid crystal display such as a television.

Recently, liquid crystal displays have been used in television sets instead of conventional CRT based systems. In particular, transmissive liquid crystal display members have attracted attention because of their potential for use as a pocket color television display and other related uses.

Reference is made to FIG. 1 wherein the manner in which transmissive liquid crystal displays operate is depicted. A light 2 is applied to a display member 1 from the back side of display member 1. An observer 3 sees the transmitted light as displayed information. The liquid crystal display member selectively allows portions of display member 1 to transmit light whereas other portions of display member 1 are opaque and prevent transmission of light 2.

Reference is next made to FIG. 2 wherein a conventional cabinet structure for liquid crystal display devices, constructed in accordance with the present invention is depicted. A transmissive liquid crystal display member 12 is located adjacent to the front of a cabinet 11 and a luminous member 13 is located behind liquid crystal display member 12. Luminous member 13 generates a light 14 which is applied to the back of liquid crystal display member 12 and an observer sees the displayed information as bright and dark regions illuminated by light 14 transmitted through liquid crystal display member 12.

The cabinet structure of FIG. 2 requires a relatively large amount of electrical power to provide luminous member 13 with electricity inside of cabinet 11. The power needed to drive luminous member 13 is relatively large, usually about 1 watt. Even if this power consumption is reduced to less than 1 watt, the power used to backlight liquid crystal display member 12 is not negligible. Especially where dry cell batteries are used as the power source, battery life is significantly shortened as a result of the power used to drive luminous member 13.

Accordingly, there is a need to increase the battery life of a pocket liquid crystal display by using ambient light, such as solar light, to back light the transmissive display member. However, there is also a need to include a luminous member in the cabinet for viewing situations where there is insufficient ambient light to produce a bright display.

SUMMARY OF THE INVENTION

The invention is directed to a cabinet for pocket machinery having a transmissive liquid crystal display member. It includes a first cabinet member for holding the liquid crystal display member and circuitry having a cavity at its rear. The liquid crystal display member is coupled to the rear of the first cabinet member within the cavity. A second cabinet member fits within the cavity in the first cabinet member and is removable from the cavity. The removal of the second cabinet member from the cavity in the first cabinet exposes the liquid crystal display member. In a preferred embodiment the pocket machinery is a pocket color television and the second cabinet member is rotatably connected to the first cabinet member and when open acts as a stand for the first cabinet member.

It is an object of the invention to provide an improved pocket machinery cabinet.

Another object of the invention is to provide a cabinet for a liquid crystal device having a transmissive liquid crystal display member which is capable of utilizing ambient light.

Another object of the invention is to provide a cabinet for a liqiud crystal device having a transmissive liquid crystal display member which conserves battery life by only using the battery to power a luminous member when there is insufficient ambient light present.

Still other objects and advantage of the invention will in part be obvious and will in part be apparent from the specification.

The invention accordingly comprises the features of construction, combinations of elements, and arrangements of parts which will be exemplified in the constructions hereinafter set forth, and the scope of the invention will be indicated in the claims.

BRIEF DESCRIPTION OF THE DRAWINGS

For a better understanding of the invention, reference is made to the following description taken in connection with the accompanying drawings, in which:

FIG. 12 is a cross-sectional view of the cabinet of FIG. 11;

FIG. 13 is a partial cross-sectional view of the cabinet of FIG. 11;

DETAILED DESCRIPTION OF THE PREFERRED EMBODIMENTS

Figure 1:
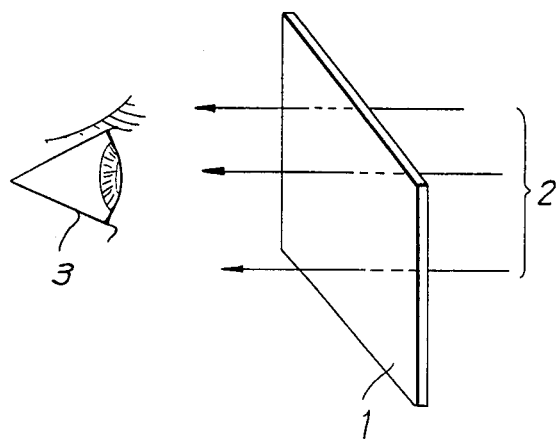
FIG. 1 is a schematic view of the operation of a transmissive liquid crystal display panel.
Figure 2:
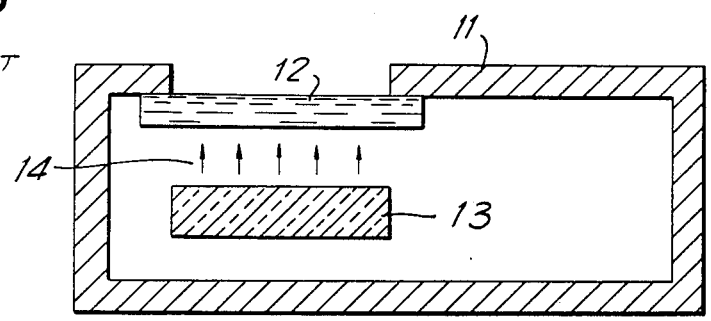
FIG. 2 is a cross-sectional view of a liquid crystal display device cabinet constructed in accordance with the prior art.
Figure 3:
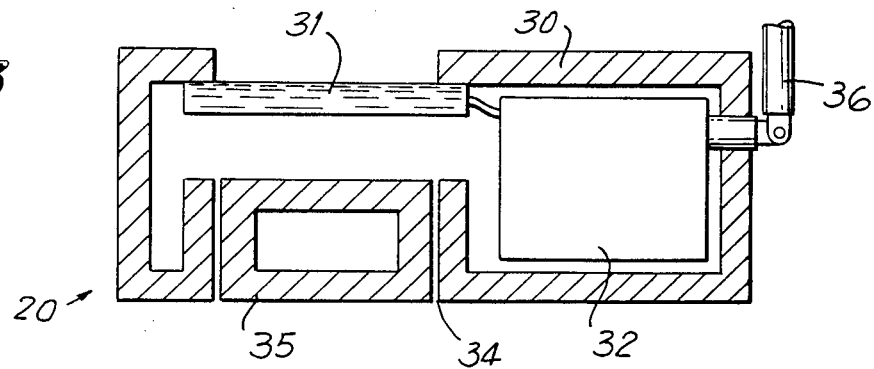
FIG. 3 is a cross-sectional view of a liquid crystal display device cabinet constructed in accordance with the present invention.

Reference is first made to FIG. 3 wherein a cabinet constructed in accordance with the present invention is depicted. A cabinet 20 consists of a first cabinet part 30 which contains a liquid crystal display member 31 and an electric circuit 32. A smaller second cabinet part 35, along with first cabinet part 30 make up cabinet 20. Second cabinet part 35 is positioned behind liquid crystal member 31 within a cavity 34 in first cabinet part 30. Liquid crystal member 31 is fixed, adjacent to the upper plane of cabinet part 30, with a screw (not shown) or other connector.

Second cabinet part 35 can either be completely removed from cabinet part 30 or merely rotate out of cavity 34. When second cabinet part 35 is removed from the rear of liquid crystal display member 31, ambient light, such as sunlight, is applied to the rear of liquid crystal display member 31. An observer sees the transmitted light that is allowed through liquid crystal display member 31 by circuitry 32 as displayed information.

Figure 4:
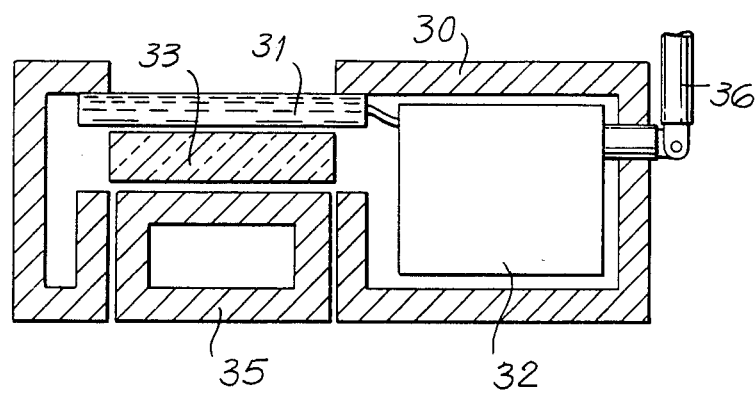
FIG. 4 is a cross-sectional view of another embodiment of a liquid crystal display device cabinet constructed in accordance with the invention.

Reference is next made to FIG. 4 wherein another embodiment of a cabinet structure constructed in accordance with the invention is depicted. The cabinet of FIG. 4 is similar to the cabinet of FIG. 3 except that a luminous member 33, which is made of a light transmissive material, is located between second cabinet part 35 and liquid crystal display member 31. In another embodiment second cabinet part 35 can itself be the luminous member. In either of these two cases the liquid crystal display member 31 can be backlit by either the ambient light or by the luminous member when there is inadequate ambient light.

Figure 5:
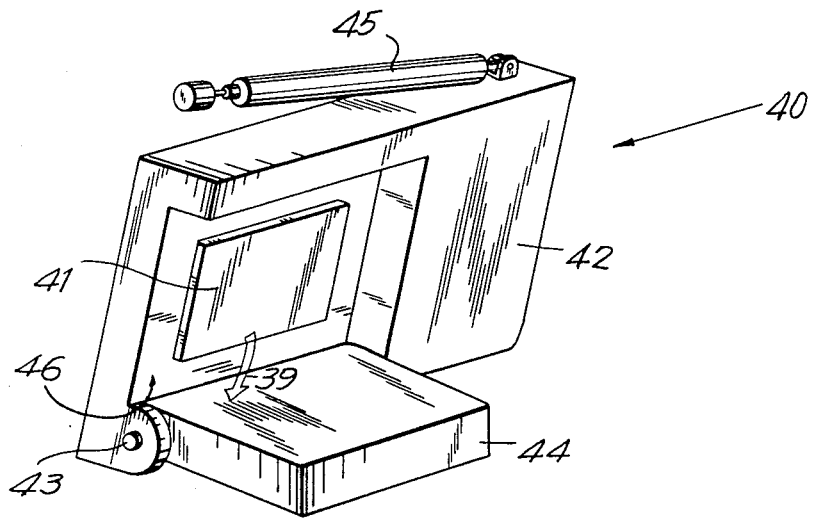
FIG. 5 is a perspective view of a cabinet for a liquid crystal device constructed in accordance with another embodiment of the invention.

Reference is next made to FIG. 5 wherein another embodiment of a cabinet, generally indicated as 40, constructed in accordance with the invention is depicted. Cabinet 40 includes a first cabinet part 42 having a transmissive liquid crystal display member 41 attached within a cavity 46 in the rear of cabinet part 42. A second cabinet part 44, configured to fit within cavity 46 is rotatably supported by a connector 43. A telescoping rod antenna 45 is attached to cabinet part 42 for better reception of television or other signals to be received.

As is evident from FIG. 5 second cabinet part 44 serves as a stand when it is rotated away from display member 41 in the direction of arrow 39. In addition, if dry cell batteries are contained within second cabinet part 44 the stand becomes more stable. In addition, because second cabinet part 44 is separate from first cabinet part 42 any electrolyte leakage from the batteries would not effect liquid crystal display member 41 or electric circuits contained within first cabinet part 42.

Figure 6:
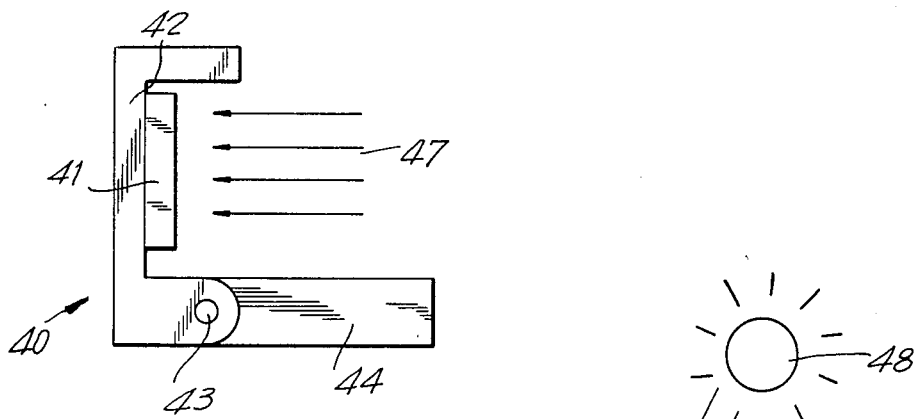
FIG. 6 is a side elevational view of the cabinet of FIG. 5.
Figure 7:
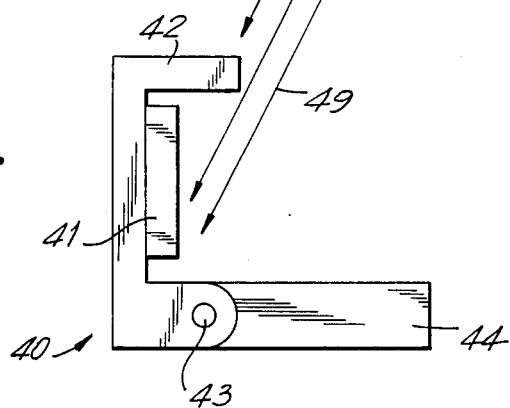
FIG. 7 is a side elevational view of the cabinet of FIG. 5.

Reference is next made to FIGS. 6 and 7 wherein the effect of ambient light on the cabinet of FIG. 5 is depicted. Where the ambient light enters the rear of cabinet 40 as shown by arrows 47 liquid crystal display member 41 is adequately illuminated and an image is clearly and brightly displayed to an observer (FIG. 6). When the sun 48 is particularly high in the sky, as around noon, the incident angle of the sunlight 49 is close to ninety degrees and a portion of liquid crystal display member 41 is likely to be shaded from light rays 49 by cabinet part 42. However, because of the small size of the cabinet 40 it can be easily angled to allow all of liquid crystal display member 41 to be illuminated by sunlight 49.

Figure 8:
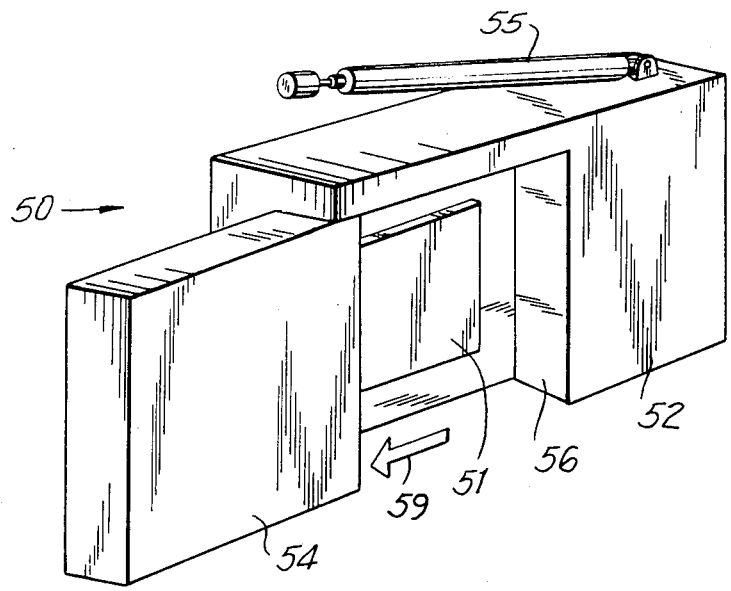
FIG. 8 is a perspective view of another embodiment of a cabinet constructed in accordance with the invention.

Reference is next made to FIG. 8 wherein an alternate embodiment of a cabinet, generally indicated as 50, constructed in accordance with another embodiment of the invention, is depicted. Cabinet 50 is the same as cabinet 40 of FIGS. 5-7 except that a second cabinet part 54 slides in the direction of arrow 59 instead of rotating. Second cabinet part 54 can be completely removed by sliding it far enough in the direction of arrow 59. It can also remain attached, though completely exposing liquid crystal display member 51 and along with a first cabinet part 52 act as a stand. Cabinet 50 also includes an antenna 55.

Figure 9:
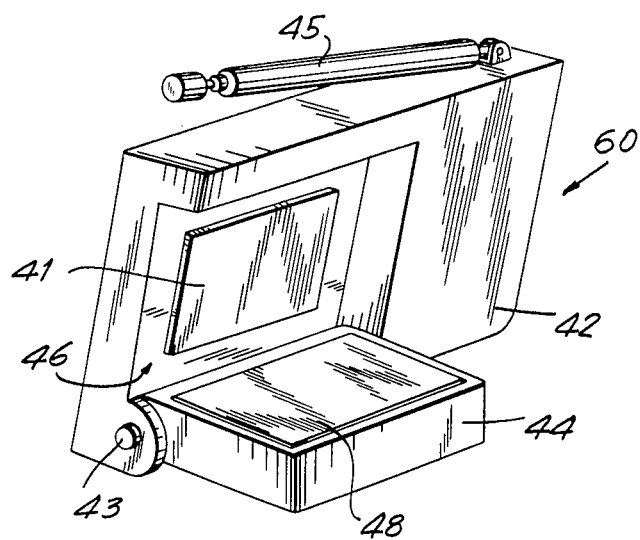
FIG. 9 is a perspective view of another embodiment of a cabinet constructed in accordance with the invention.
Figure 10:
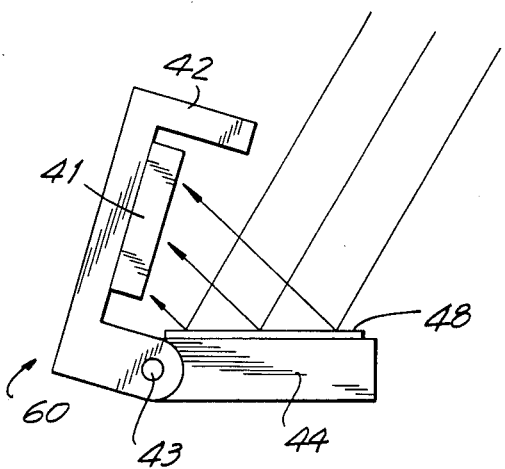
FIG. 10 is a side elevational view of the cabinet of FIG. 9.

Reference is next directed to FIGS. 9 and 10 wherein an alternate embodiment of a cabinet constructed in accordance with the invention is depicted. Cabinet 60 is identical to cabinet 40 of FIGS. 5-7 except that it also includes a reflective plate 48 formed on the surface of second cabinet part 44 facing liquid crystal display member 41. With reflective plate 48, ambient light, such as sunlight around noon, when the sun is high in the sky and there is a large incident angle, is reflected off of reflective plate 48 and applied to the back of liquid crystal display member 41 (FIG. 10).

The surface of reflective plate 48 can be a completely reflecting surface. However, if the surface of plate 48 is made to diffuse the light in addition to reflecting it incident light at various incident angles are efficiently reflected and applied to the entire rear surface of liquid crystal display member 41. Reflective plate 48 is formed on second cabinet part 44 in the embodiment of FIG. 4. However, reflective plate 48 can also be formed on the surface of second cabinet part 44 by chemically processing the surface of second cabinet part 44 or coating it with metal.

Reference is next made to FIGS. 11-14 wherein another embodiment of a cabinet 100 constructed in accordance with another embodiment of the invention is depicted. Cabinet 100 is composed of cabinet part 122 having a void 135 in its rear. A small box 120 fits within void 135 in the rear of cabinet part 122.

Transmissive liquid crystal display member 121 and a light conducting member 126 of transparent plastic, a circuit substrate and a shield case are secured near the upper surface of cabinet part 122 with a screw 123.

Reference is next made to FIG. 13 wherein a light 125 generated by a cylindrical florescent tube 124 enters light conducting member 126 and is scattered by the uneven surface (fresnel surface) 140 formed on the side of small box 120 facing liquid crystal display member 121 to cover the entire liquid crystal display surface.

Small box 120 is rotatably connected to cabinet part 122 by a pivot 127. Five dry cell batteries 141 are contained in small box 120 to supply the power to the electronic components (not shown), formed on electric circuit substrates 133. The electric circuit (not shown), receives signals using a rod antenna 136 and transmits video information to liquid crystal display member 121.

Figure 14:
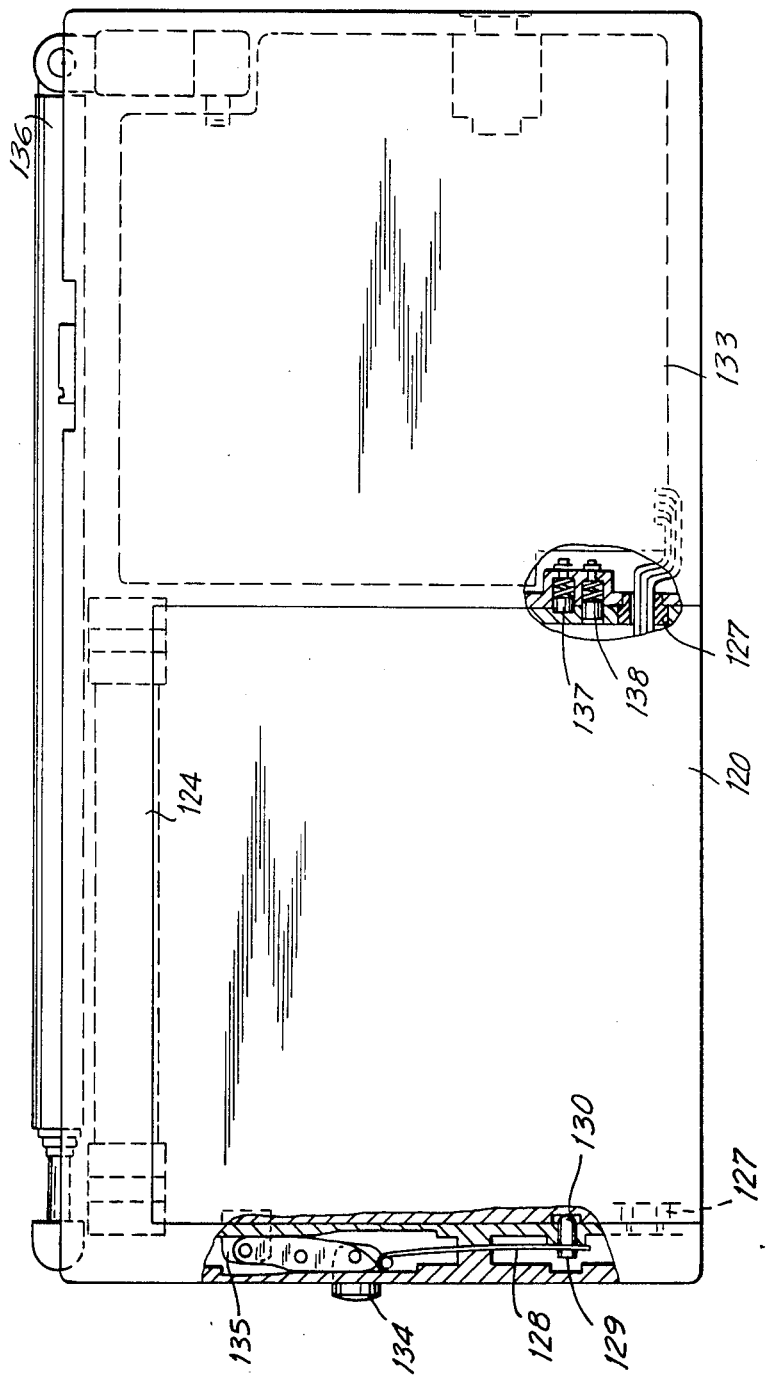
FIG. 14 is a front plan view of the cabinet of FIG. 11 with portions broken away.

Reference is next made to FIG. 14 where the manner in which the small box 120 is opened and closed is depicted. Cabinet 100 is constructed so that when a button 134 is pushed a locking pin 135 is freed from small box 120 and small box 120 can be rotatably removed from the rear of liquid crystal display member 121. When small box 120 is rotated outward from cabinet part 122 a pin 129, which is biased against small box 120 by a spring 128, fits within a recess 130 in small box 120, thereby defining and locking the position of small box 120. On the other side of small box 120 a pin 137 for defining the position of small box 120 and a pin 138 to control the rotation of small box 120 are provided. In this way the rotation of small box 120 is accurately controlled and the box is stable in its open position. When open, box 120 serves as a stand as well as a reflecting surface.

Figure 11:
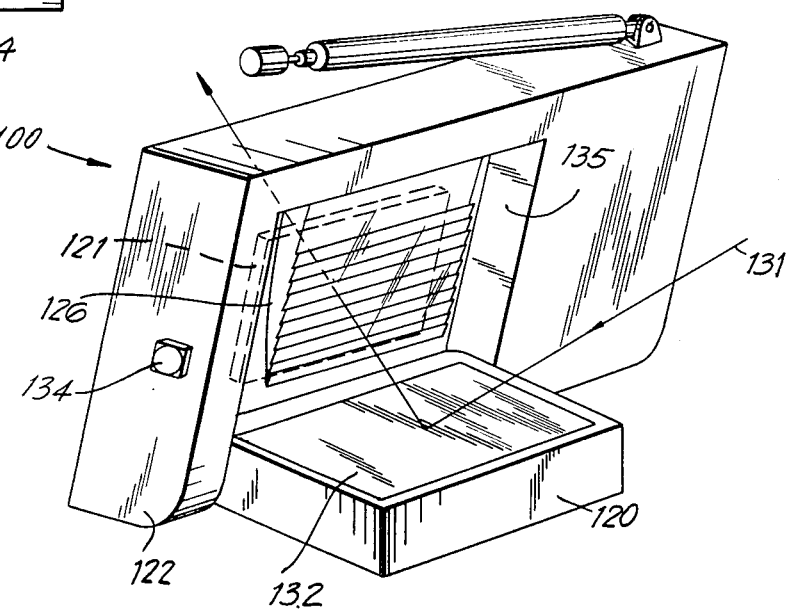
FIG. 11 is a perspective view of another embodiment of a cabinet constructed in accordance with the invention.

Reference is next made to FIG. 11 wherein the effect of incident light on cabinet 100 when small box 120 is rotatably removed from cabinet part 122 is depicted. With small box 120 rotated outward, light conducting member 126 is exposed to ambient light 131, such as sunlight, both directly and reflected by the upwardly facing reflective surface 132 of small box 120. Face 132 is made reflective to enhance the amount of ambient light reflected onto light conducting plate 126. Reflective surface 132 can either be a separate plate attached to the surface of small box 120 or be formed as the surface of small box 120. In order to provide sufficient light, reflecting surface 132 can be made a diffusably reflecting surface so as to reflect more light to display member 121 with ambient light at various incident angles.

The embodiment of FIG. 11-14 has a luminous member 124 included within cabinet 100 for situations where there is insufficient ambient light to backlight liquid crystal display member 121. However, when there is ambient light it is not necessary to use luminous member 124 to light liquid crystal display member 121. Rather, ambient light 131 is reflected off reflective plate 132 onto liquid crystal display member 121. Additional stability is provided because batteries 141 are held in small box 120, which serves as a stand for cabinet 100. In addition, since small box 120 and cabinet part 122 are separated from each other a leakage of electrolyte from the batteries will not affect electric circuitry (not shown), in cabinet part 122.

Figure 15:
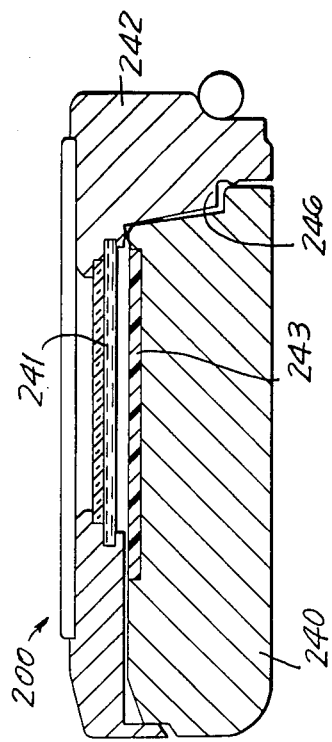
FIG. 15 is a side elevational view of another embodiment of a cabinet constructed in accordance with the invention.

Reference is next made to FIG. 15 wherein a cabinet 200, constructed in accordance with an alternate embodiment of the invention is depicted. In this embodiment a small box 240 in the rear of cabinet part 242 is, itself a luminous member. In this configuration because a light conducting member and a cylindrical florescent tube are not required cabinet 200 can be made thinner than can cabinet 100 of FIGS. 11-14.

The surface of small box 240 facing liquid crystal display member 241 is formed with a semi-transparent-semi-reflective layer 243 which allows light from the luminous member formed within small box 240 to reach display member 241 while also reflecting incident ambient light, such as sunlight, when small box 240 is rotated away from display member 241. Semi-transparent-semi-reflective layer 243 is made of a milk-white plastic plate, a half mirror or the like. When it is dar, or there is insufficient ambient light, small box 240 is in its usual position within cavity 246 of cabinet part 242 and light from the luminous member formed within small box 240 is used to backlight display member 241. However, when there is sufficient light present small box 240 is rotatably removed as shown in FIG. 11 and the ambient light reflected off semi-transparent-semi-reflective layer 243 backlights display member 241.

Accordingly, a liquid crystal display cabinet in which ambient light, such as sunlight, is used to backlight a display when there is sufficient ambient light present is provided. The ability to utilize the ambient light to backlight the display member in a transmissive liquid crystal display system greatly reduces the power consumption of a portable or pocket liquid crystal display device. This reduction in power consumption increases the battery life of the liquid crystal display device which, being portable, depends upon dry cell batteries to power the electronic circuitry as well as the internal light.

In addition, when sunlight is used to backlight the display a clear picture is obtained outdoors. In addition, because the small box fits within the larger cabinet part when it is in the internal illuminating position the cabinet is easily carried and handled.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also understood that the following claims are intended to cover all of the generic and specific features of the invention herein described and all statements of the scope of the invention which, as a matter of language, might be said to fall therebetween.

What is claimed is:

1. A device having a transmissive liquid crystal display member, comprising:
   first cabinet means for holding the liquid crystal display member, said first cabinet means having a cavity at its rear, said liquid crystal display member being mounted to said first cabinet means within the cavity so as to be visible from the front of said first cabinet means;
   second cabinet means fitting within the cavity and being removable from said cavity;
   reflector means on a surface of the second cabinet means, said reflector means being positioned, when said second cabinet means is removed from said cavity, to reflect ambient light to the liquid crystal display member; and
   light transmissive means between the liquid crystal display member and the reflector means for transmitting incident light to the liquid crystal display member;
   whereby the removal of the second cabinet means from the cavity in the first cabinet means exposes the liquid crystal display member.

2. The device of claim 1, including means coupling said first and second cabinet means while permitting the displacement of said second cabinet means into and out of said cavity.

3. The device of claim 2 wherein said coupling means rotatably secures said second cabinet means to the first cabinet means.

4. The device of claim 2 wherein said coupling means slidably secures said second cabinet means to the first cabinet means.

5. The device of claim 1, wherein the reflector means comprises a fully reflective plate.

6. The device of claim 1 wherein the reflector means is a diffusably reflective member.

7. The device of claim 1 wherein the reflector means is a semi-transparent-semi-reflective plate.

8. The device of claim 1 wherein the second cabinet means further includes illuminating means for backlighting the liquid crystal display member.

9. The device of claim 2 wherein the second cabinet means serves as a stand for the cabinet when the second cabinet means is displaced from the cavity.

10. The device of claim 1, wherein the second cabinet means further includes power supply means for at least powering said display member.

11. The device of claim 1, further including locking means for selectively locking the second cabinet means within the cavity in the first cabinet means.

12. The device of claim 11, wherein the locking means comprises a trigger means coupled to the first cabinet means and hook means coupled to a button and to the second cabinet means whereby a pressure exerted on the trigger means causes the hook means to decouple from the second cabinet means.

13. The device of claim 12 wherein the trigger means is a button.

14. The device of claim 1, further including illuminating means within the first cabinet means for backlighting the liquid crystal display member.

15. The device of claim 1 further including illuminating means within the second cabinet means for backlighting the liquid crystal display member.

16. The device of claim 14, wherein the illuminating means comprises a light transmissive luminous member behind the liquid crystal display member.

17. The device of claim 14, wherein the illuminating means is a cylindrical florescent tube.

18. The device of claim 15 wherein the illuminating means is a cylindrical florescent tube.

19. The device of claim 14, wherein the illuminating means projects a light substantially parallel to the liquid crystal display member and the second cabinet means further includes scattering means for redirecting the substantially parallel light so as to illuminate a desired region of the liquid crystal display member.

20. The device of claim 19, wherein the scattering means is an uneven surface.

21. The device of claim 19 wherein the scattering means comprises a fresnel surface.

22. The device of claim 15 wherein the illuminating means projects a light substantially parallel to the liquid crystal display member and the second cabinet means further includes scattering means for redirecting the substantially parallel light so as to illuminate a desired region of the liquid crystal display member.

23. The device of claim 22 wherein the scattering means is an uneven surface.

24. The device of claim 1 further including antenna means coupled to the first cabinet means.

25. The device of claim 1 wherein the device is a pocket liquid crystal television set.

26. A cabinet for pocket machinery having a transmissive liquid crystal display member, comprising:
    first cabinet means for holding the liquid crystal display member, said first cabinet means having a cavity at its rear, said liquid crystal display member being mounted to said first cabinet means within the cavity;
    and second cabinet means fitting within the cavity and being removable from said cavity and including illuminating means for backlighting the liquid crystal display member;
    whereby the removal of the second cabinet means from the cavity in the first cabinet means exposes the liquid crystal display member.

27. The cabinet of claim 26, including means coupling said first and second cabinet means while permitting the displacement of said second cabinet means into and out of said cavity.

28. The cabinet of claim 26 wherein the second cabinet means further includes reflector means on a surface thereof, said reflector means being positioned, when said second cabinet means is removed from said cavity, to reflect ambient light to the liquid crystal display member.

29. The cabinet of claim 26 wherein the second cabinet means serves as a stand for the cabinet when the second cabinet means is displaced from the cavity.

30. The cabinet of claim 26, wherein the second cabinet means further includes power supply means for at least powering said display member.

31. The cabinet of claim 26, further including locking means for selectively locking the second cabinet means within the cavity in the first cabinet means.

32. The cabinet of claim 26, wherein the illuminating means comprises a light transmissive luminous member behind the liquid crystal display member.

33. The cabinet of claim 26, wherein the illuminating means projects a light substantially parallel to the liquid crystal display member and the second cabinet means further includes scattering means for redirecting the substantially parallel light so as to illuminate a desired region of the liquid crystal display member.

34. The cabinet of claim 33 wherein the scattering means is an uneven surface.

* * * * *